Oct. 20, 1942. L. S. SHELDRICK ET AL 2,299,412

BRAKE

Filed July 24, 1941

INVENTORS
L. S. Sheldrick and
Henry G. Ferguson
BY E.C. McRae & Robert J. Harris.
ATTORNEYS WITNESS
William Tilly Patented Oct. 20, 1942

2,299,412

UNITED STATES PATENT OFFICE 2,299,412

BRAKE

Laurence S. Sheldrick, Dearborn, Mich., and Henry G. Ferguson, Belfast, Northern Ireland, assignors to Ford Motor Company, Dearborn, Mich., a corporation of Delaware, and Ferguson-Sherman Manufacturing Corporation, Dearborn, Mich., a corporation of Delaware Application July 24, 1941, Serial No. 403,796

9 Claims. (Cl. 188—106)

This invention relates to brakes, and more particularly to brakes for agricultural tractors and similar vehicles.

In ordinary service such tractors are called upon to operate over rough and broken ground such as plowed fields or uncultivated terrain. Further, such ground may be soft or swampy. Under such conditions, it has been found that the ordinary method of steering motor vehicles, i. e., by directional alignment of the front wheels, is far from satisfactory. If the front wheels are turned from a straight alignment in such service, it will be found that instead of causing the vehicle to turn, the front wheels will merely plough into soft or uneven earth, or will be deflected unevenly. At any rate, the tractor's direction will not be readily changed. This is particularly true when sharp turns are to be negotiated.

For dependable steering control, a more positive method must be used. One mode which is particularly effective is by selective braking of the rear wheels of the tractor. As an example, if it is desired to steer a tractor to the right, the right-rear wheel is retarded. This is much more certain in action than the wheel alignment and can be used to give a short turning radius which is particularly advantageous. In addition, it is not affected by inequalities in the ground surface or by soft or swampy ground. However, when it is desired to drive the tractor over a smooth, hard surface such as a road, the usual steering method by wheel alignment is more flexible and easier to operate. It follows that two modes of steering should be provided: one for use in rough or soft ground by selective braking of the rear wheels; and the other for use on highways, consisting of the conventional method of wheel alignment.

An object of this invention, therefore, is to devise a brake for a pair of wheels by which braking force may be applied selectively to one wheel or the other for steering purposes; and braking forces may be applied to both wheels at once to retard the speed of the vehicle. It is a further object to provide a construction in which the well-known self-energizing action of a brake is controlled and equalized. As tractors are subjected to extremely hard usage, it is essential that such a braking mechanism be sturdy and compact; and as they are not usually provided with a body structure which in some measure supports and protects the brake control in an automobile, the tractor brake control and mechanism must be so disposed as not to interfere with the operation or accessibility of the tractor.

These objects are accomplished in the brake of our invention, which may be selectively operated to steer a tractor or may be operated as a regular brake. Hereinafter these actions will be referred to as the steering brake and the service brake.

With these and other objects in view, our invention consists in the arrangement, construction and combination of the various parts of our improved device as described in the specification, claimed in the claims, and illustrated in the accompanying drawing in which:

Figure 1:
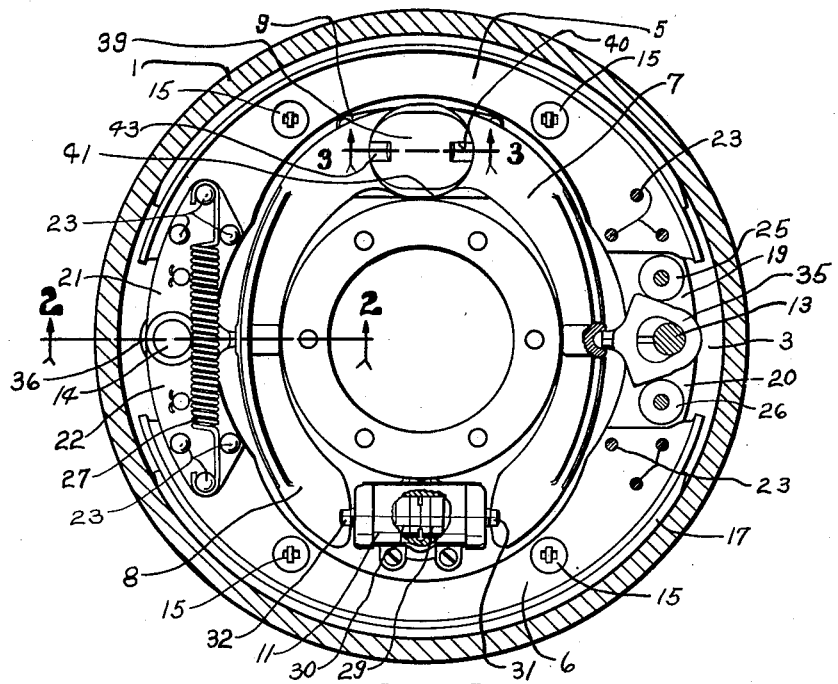
Figure 1 is an elevation of the brake of this invention, a portion thereof being shown in cross section.

Referring to the accompanying drawing in which corresponding reference figures represent like parts in the various views, the mechanism of this invention includes the brake drum 1 which is attached to the wheel of the vehicle and rotates with it; and the brake plate 3 which carries the braking mechanism and is attached to the axle housing, a usual construction in this art. The mechanism comprises brake shoes 5, 6; the brake beams 7, 8; the collar 9; a fluid pressure cylinder 11; and the anchor bolts or pins 13, 14; each of these components being rigidly affixed to the plate with the exception of the brake shoes which are loosely held thereon by spring retainers 15, and the beams. The brake shoes 5 and 6 are generally T-shaped in section, the flanges thereof carrying the brake bands 17, which engage the brake drum when the brake is operated. At each end of each brake shoe, extending ears such as 19, 20, 21 and 22 are attached on each side of the shoes as by the rivets 23. The outer ends of these ears are adapted to enclose partially the anchor bolts 13 and 14 as shown in the sectioned portion of Figure 1. Also shown in this view are the cam rollers 25 and 26 which are mounted between each pair of ears. It should be understood that the mechanism of Figure 1 is symmetrical about a vertical center line and that similar cam rollers are positioned beneath each of the ears 21 and 22 and similar springs 27 above each of the ears.

Figure 2:
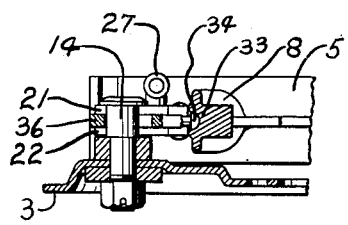
Figure 2 is a partial cross section taken on the line 2—2 of Figure 1.
Figure 3:
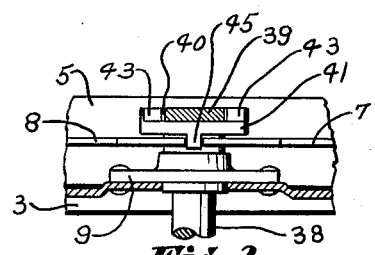
Figure 3 is a partial cross section taken on the line 3—3 of Figure 1.

The two brake shoes are held in retracted position by the springs 27; and in this position, the ears are drawn against the anchor bolts 13 and 14. The brake beams 7 and 8 are disposed within the brake shoes and are supported therein by engagement with the operating mechanism. One such mechanism, shown in the lower part of Figure 1, is the hydraulic cylinder 11 which includes the pistons 29 and 30, having extending piston rods 31, 32. These piston rods are slotted to receive the lower ends of the brake beams 7 and 8. The upper ends of the brake beams are supported on the collar 9, as shown in Figure 3, and form part of a mechanically-operated brake mechanism more fully described hereafter. Sockets 33 are provided substantially at the mid-point of each brake beam, and ball joints 34 of the plunger cams 35 and 36 are disposed therein. These cams are provided with external camming surfaces cooperating with the cam rollers 25 and 26 and internal camming surfaces cooperating with anchor bolts 13 or 14. Reference to Figure 2 will show that the cams are disposed between the extending ears of the brake shoes and encompass the anchor bolts.

Attention is now directed to the collar 9 and its included mechanism. This, as shown in Figure 3, comprises the steering brake control shaft 38 which is rotatably mounted in the collar and at whose outer end is the coupling plate 39 having slots 40. This coupling plate forms one element of a modified Oldham's coupler, a device which is well-known and frequently used when it is desired to transmit the motion between two shafts not having a common axis. The intermediate element of this coupling is the plate 41 which is loosely mounted on the collar 9 and which includes on its upper surface the two lugs 43 cooperating with slots 40; and on its lower surface the two lugs 45. The third element of this coupling is formed by the upper ends of the two brake beams 7, 8 which, as was noted previously, partially enclose the collar 9. The lugs 45 occupy the space between ends of such brake beams.

Figure 4:
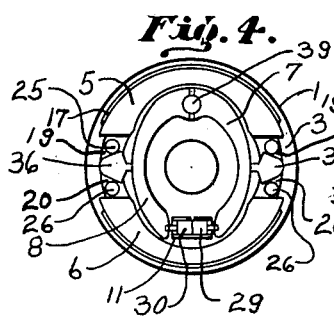
Figure 4 is a diagrammatic view of the brake unengaged.
Figure 5:
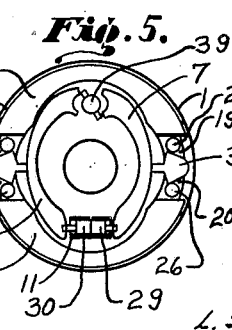
Figure 5 is a diagrammatic view of the brake engaged by operation of the steering brake.
Figure 6:
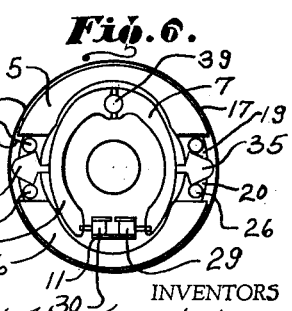
Figure 6 is a diagrammatic view of the brake engaged by operation of the service brake.

We now direct attention to Figures 4, 5 and 6 which show the various stages of the operation of this device. Figure 4 shows the brake in an inoperative or nonengaging position. Neither the hydraulic nor the mechanical activating devices are in operation. As a result the cams are forced inwardly and the brake beams are in the normal position. The brake shoes are retracted and the brake lining is not in engagement with the brake drum. In this position the drum is free to revolve and there is no braking action.

Figure 5 illustrates diagrammatically the mechanical operation of the brake. In this case the upper mechanism has been rotated and the brake beams, pivoting at the piston, have been forced outwardly. As a result the cams have been advanced and the brake shoes have entered into engagement with the brake drum. The wheel to which this braking action has been applied is now retarded and the tractor direction changed accordingly. The detailed operation of the mechanism in the upper half of Figure 1 is as follows. It is apparent that rotation of the brake shaft 38 will cause a similar rotation of the coupling plate 39, and the intermediate plate 41 with its lower lugs 45. Rotation of these lugs tends to force apart the upper ends of the brake beams 7, 8. It thus follows that when the brake control shaft 38 is rotated, the brake beams may be considered as pivoting about the extremities of the piston rods 31, 32; and the upper ends of the beams are forced outwardly. As these beams move outward the cams 35, 36 are advanced; and these, bearing on the cam followers 25, 26 force the brake shoes 5, 6 into contact with the brake drum 1.

However, it should be recalled that the brake drum 1 is rotating with the wheel of the vehicle and as the brake shoes 5, 6 come in contact with it, they tend to be drawn by friction in the direction of travel of the brake drum. Assuming the direction of the brake drum to be counterclockwise in Figure 1, when the brakes are applied the upper brake shoe 5 would tend to move toward the left while the lower brake shoe 6 would tend to move toward the right in response to the frictional forces. The result of this is that the upper brake shoe may now be considered as pivoted at the left anchor bolt 14; and the lower brake shoe may be considered as being pivoted about the right anchor bolt 13. The action of the cams 35, 36 is then such as to cause the brake shoes to swing outwardly about such pivot points.

In the case under consideration, cam 35 will not move out horizontally under the influence of the braking action; but will move diagonally upwardly and outwardly. This is because the right end of the brake shoe 6 tends to be forced against the anchor bolt 13 as a result of the self-energizing action, and the right end of brake shoe 5 is alone initially free to move in response to the cam. However, the forces exerted on the brake shoes are to be automatically equalized and the cam position is altered accordingly throughout the braking operation. Thus, since the forces are approximately equally distributed between each shoe, if the forces at the free end exceed those at the pivot end of a shoe (right and left end, respectively, in shoe 5 under the stated issue), a similar condition would prevail on shoe 6 (left and right ends, respectively). This creates an imbalance of forces at the two pivot points, namely, at anchor bolts 13 and 14. But since the shoes are not fixed at these pivot points, the imbalance may be automatically equalized by a suitable motion of the internal surfaces of the cams about the anchor bolts with a consequent readjustment of position of the brake shoes. This entails a vertical, as well as horizontal, motion on the part of the cams. It is for this reason that they are mounted with a ball joint and with the internal camming surfaces shown.

When the brake is to be released, the brake control shaft 38 is rotated to its original position in which the lugs 45 are disposed vertically. This permits the upper ends of the brake beams to approach each other, the cams to be retracted and the brake shoes to disengage the drum under the influence of the springs 27, completing the cycle of operation.

In Figure 6 the hydraulic operation of the braking mechanism is shown. In this case the hydraulic fluid has been admitted through usual means not shown herein to the cylinder 11 and the pistons 29, 30 therein have been forced outwardly. As a result, the brake beams 7, 8, considered now as being pivoted about the collar 9, are forced outward and the cams are carried with them. Again the brake shoes are forced into engagement with the brake drum and the braking action results. The detailed operation is the same as that described with reference to Figure 5, save that the brake beams pivot about the collar and swing outwardly in response to the piston action. The force applied to each brake beam is, of course, equal as it is applied hydraulically through the common cylinder 11. It will be noted that the upper ends of the brake beams 7 and 8 do not fit closely against the lugs 45 of the coupling plate but are sufficiently free to permit their pivoting about the column 9.

In the event that the vehicle is running in reverse, the braking action is similar, except that the pivot points may now be considered as reversed; and the braking force is applied in an opposite sense. In other respects the equalization and compensation are carried out automatically in the same steps as described above.

When the mechanically-operated brake has been applied to one of a pair of wheels for steering purposes, the hydraulically-operated brake may be applied to both wheels to stop the vehicle without first releasing the mechanical brake. The braking action will be uniform on both wheels since the force applied by the fluid pressure in the hydraulic system is uniform between the wheels; and the braking force exerted by the mechanical activation is automatically equalized.

We prefer to use the mechanically-activated brake during field work when it is desired to apply a selective braking force to one wheel or the other to steer the vehicle. This brake is easy to control selectively in that but two brake shafts are required, one leading to each of the rear wheels which may be operated separately. When the vehicle is in operation and it is desired to turn it toward the right it is only necessary to rotate the brake control shaft leading to the right-rear wheel and vice versa. This will change the direction of the vehicle and will be effective and positive on the roughest ground.

In the usual arrangement, heretofore, there have been three pedal controls: one for each of the wheel brakes and one for the clutch. In addition, some form of interlock is generally provided between the clutch pedal and one brake so that the one brake and clutch may be operated simultaneously with one pedal. However, no common pedal is provided by which both brakes may be operated simultaneously and in synchronism. Consequently, smooth and effective braking could not be achieved.

Our construction preferably employs one pedal to control the hydraulic brakes on both wheels, two other pedals individually controlling the mechanical brakes, and a fourth for the clutch. This combines the advantages of brake steering and regular braking without interference or complexity of operating mechanism.

It will be seen from the foregoing that the operation of this brake is such that it may be used in ordinary road service as a hydraulic brake; and may be selectively used in field or agricultural service as an individual steering brake. Of course, it is to be understood that, if so desired, the mechanical activation might be used for road work and the hydraulic activation for field work. However, we find it to be preferable to use the hydraulic operation for road work on account of the greater speeds involved and the greater ease of operation and control. In addition, selective control means are simpler with the use of the mechanical brake.

By the use of the coupling device referred to in the description of a mechanical activating feature, absolute alignment of the brake control shaft and the operating mechanism is not imperative. In addition, the specific construction shown for this feature is extremely compact and rugged.

We have devised a brake which has two selectively operable braking mechanisms; one such mechanism to be used in general service purely as a retarding brake, the other to be used as a steering brake. These are so combined that there is no unnecessary duplication of parts since the braking force in each case is exerted through the same brake shoes and brake beams. The brake, as constructed, occupies no greater space than the conventional brake. Apart from the usual conduits and control found in the conventional hydraulic braking system, but two additional selectively operable brake control rods are required. Provision has been made for automatic utilization of and compensation for self-energization of the brake; and this takes place whether the vehicle is running forward or in reverse and whether the operating force is hydraulic or mechanical. No changeover is required when one system or the other is to be operated; and they may be used separately or concurrently as conditions may require.

Some changes may be made in the arrangement, construction and combination of the various parts of our improved device without departing from the spirit of our invention and it is our intention to cover by our claims such changes as may reasonably be included within the scope thereof.

We claim as our invention:

1. A vehicle brake comprising, a drum, a plate, an upper and a lower brake shoe selectively pivoted on pivot points adjacent opposite sides thereof, brake beams at each side thereof, mechanical means disposed between adjacent ends of said brake beams, hydraulic means disposed between the opposite adjacent ends of such brake beams, whereby either of said means may serve as a pivot for said beams in the event of the operation of the other of said means, and cams disposed on such brake beams and operable about said selective pivot points.

2. A vehicle brake comprising, a drum, a plate, a pair of opposed brake shoes, anchor pins, a pair of opposed brake beams, a pair of selectively operable operating means, one such means disposed on said plate between adjacent ends of said brake beams, the other such means disposed on said plate between the opposite adjacent ends of said brake beams, said brake beams being arranged for pivotal motion about said operating means, and cams carried by said brake beams and engaging the anchor pins and the ends of said brake shoes.

3. In a brake for a motor vehicle comprising, a brake drum, a pair of internal brake shoes having common pivotal support at their ends, a pair of activating members, mechanism operable between the adjacent ends of such activating members, the activating members having limited pivotal motion about such operating mechanism, said mechanism comprising independently operable means, cams carried by said activating members and engaging said brake shoes at the ends of such brake shoes, said cams being arranged and constructed to compensate and equalize the self-energizing action imparted to the brake shoes when brought into operating engagement with the rotating brake drum.

4. In a brake for a motor vehicle comprising, a brake drum, a pair of internal brake shoes having common pivotal support at their ends, a brake plate, a pair of activating members, mechanism operable between the adjacent ends of such activating members, said mechanism comprising independently operable fluid pressure and mechanical means, said mechanism being rigidly attached to such brake plate, said activating members having limited pivotal motion about such operating mechanisms, and supported thereby, cams carried by said activating members and operably engaging said brake shoes at the ends of such brake shoes, whereby the brake shoes are adapted to pivot about the support at the leading end of such brake shoe with reference to the rotational direction of the brake drum, and the opposite ends of such brake shoes are moved outwardly in response to the action of the cam, such braking action being effected by operation of either of said operating mechanisms.

5. In a brake for a motor vehicle comprising, a brake drum, a pair of internal brake shoes having common pivotal support at their ends, a brake plate, said pivotal support being rigidly secured to such brake plate, a pair of activating members, mechanism operable between the adjacent ends of such activating members, one such operating mechanism comprising a fluid pressure cylinder having piston, means to force apart one pair of adjacent ends of said activating members, the other such operating mechanism including a rotational cam designed to force apart the other pair of adjacent ends of such activating members on rotation of said cam, plunger cams carried by said activating members and operably engaging said brake shoes at the ends of such brake shoes, whereby when such activating members are motivated by either of said operating mechanisms, such plunger cams are forced outwardly causing each of said brake shoes to pivot about its leading end with respect to the direction of rotation of the brake drum, its other end being forced outwardly into engagement with such brake drum.

6. In a brake for a motor vehicle comprising, a brake drum, a brake plate, a pair of internal brake shoes having common pivotal support at their ends, such pivotal support being rigidly secured to the brake plate, a pair of activating members, mechanism operable between the adjacent ends of such activating members, the activating members having limited pivotal motion about such operating mechanism, said operating mechanism including a rotational cam constructed and arranged to extend the ends of such activating members on operation of such cam, and comprising a shaft bearing a slotted plate at the end thereof, said activating members being between said slotted plate and said brake plate, an intermediate coupler plate between such end plate and the activating members, said coupler plate being provided with lugs on one surface engaging the slots in said end plate and with lugs on its other surface disposed between the ends of such activating members.

7. A brake for a motor vehicle comprising, a drum, a plate, a pair of anchor pins secured to said plate and diametrically disposed thereon, a pair of opposed brake shoes movably secured to said plate and pivotally engaging said pins, a fluid pressure cylinder attached to said plate between said pins, a collar attached to said plate and diametrically disposed to said cylinder, pistons in said cylinder, a pair of opposed brake beams disposed between and pivotally supported by said cylinder and said collar, a rotational cam on such collar, a plunger cam on each said brake beam operable between adjacent ends of said brake shoes and cooperating with said pins, and spring means normally restraining the said brake shoes from contact with said drum.

8. In a braking system, having a brake plate, activating means pivotally supported on said plate, an operating means between adjacent ends of said activating means, said operating means including a rotational cam constructed and arranged to extend the adjacent ends of said activating members, and comprising a shaft extending through said brake plate and between the adjacent ends of said activating members, a slotted plate at the outer end of said shaft and movable therewith, said activating members being disposed between said slotted plate and said brake plate, an intermediate coupler plate between said end plate and the activating members, said coupler plate being provided with lugs on one surface, engaging the slots in said end plate and with lugs on its other surface disposed between the ends of said activating member.

9. A vehicle brake comprising, a drum, a plate, a pair of opposed-brake shoes, anchor pins, a pair of opposed-brake beams, a pair of selectively operable operating means, one such means disposed on said plate and designed to extend adjacent ends of said brake beams, the other said means disposed on said plate and designed to extend the opposite adjacent end of said brake beams, said brake beams being arranged for pivotal motion about said operating means, and means carried by said brake beams and co-operating with said anchor pins and the ends of said brake shoes.

LAURENCE S. SHELDRICK.
HENRY G. FERGUSON.